United States Patent
Rothstein et al.

(10) Patent No.: US 10,794,461 B2
(45) Date of Patent: Oct. 6, 2020

(54) METHOD FOR FORMING A WELDED ASSEMBLY AND RELATED WELDED ASSEMBLY

(71) Applicant: American Axle & Manufacturing, Inc., Detroit, MI (US)

(72) Inventors: Moshe Rothstein, Oak Park, MI (US); Cory J. Padfield, Royal Oak, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 158 days.

(21) Appl. No.: 15/939,327

(22) Filed: Mar. 29, 2018

(65) Prior Publication Data
US 2018/0306302 A1 Oct. 25, 2018

Related U.S. Application Data

(63) Continuation-in-part of application No. 15/491,081, filed on Apr. 19, 2017.

(51) Int. Cl.
*B23P 15/14* (2006.01)
*F16H 55/17* (2006.01)
(Continued)

(52) U.S. Cl.
CPC .............. *F16H 55/17* (2013.01); *B23F 9/04* (2013.01); *B23F 15/06* (2013.01); *B23P 15/14* (2013.01);
(Continued)

(58) Field of Classification Search
CPC .......... F16H 55/17; F16H 48/38; F16H 55/06; F16H 2048/385; B23K 26/282;
(Continued)

(56) References Cited

U.S. PATENT DOCUMENTS

| 4,070,920 A | 1/1978 | LeBlanc | |
|---|---|---|---|
| 4,856,166 A | * 8/1989 | Miwa | B23P 15/14 29/893.2 |

(Continued)

FOREIGN PATENT DOCUMENTS

| CN | 106555154 A | 4/2017 |
|---|---|---|
| DE | 202004007426 U1 | 10/2004 |

(Continued)

OTHER PUBLICATIONS

English translation of JP2002322536 (Year: 2002).*
(Continued)

*Primary Examiner* — Jun S Yoo
(74) *Attorney, Agent, or Firm* — Burris Law, PLLC (57) ABSTRACT

A method for forming welded assembly. The method includes: providing a gear workpiece; forming a joining section on the gear workpiece that defines a weld interface; applying a material to the outside surface of the gear workpiece including the joining section; cutting a plurality of teeth in the material-covered gear workpiece, each of the plurality of teeth having first and second flanks and a root, wherein the material does not reside on any one of the first flanks, the second flanks and the roots; heat treating the gear workpiece to harden the teeth; and finishing the heat-treated gear workpiece in a finishing process to form a finished ring gear, the finishing process comprising at least one of a turning operation and a lapping operation; wherein the material is disposed over the weld interface on the finished ring gear. A welded assembly is also provided.

16 Claims, 7 Drawing Sheets

(51) Int. Cl.
  *F16H 55/06*   (2006.01)
  *F16H 48/40*   (2012.01)
  *B23F 9/04*    (2006.01)
  *C21D 9/32*    (2006.01)
  *C21D 7/06*    (2006.01)
  *C23F 17/00*   (2006.01)
  *B23F 15/06*   (2006.01)
  *C25D 3/38*    (2006.01)
  *F16H 48/38*   (2012.01)

(52) U.S. Cl.
  CPC ............... *C21D 7/06* (2013.01); *C21D 9/32* (2013.01); *C23F 17/00* (2013.01); *F16H 48/40* (2013.01); *F16H 55/06* (2013.01); *C25D 3/38* (2013.01); *F16H 2048/385* (2013.01)

(58) Field of Classification Search
  CPC ...... B23K 9/167; B23K 9/173; B23K 9/0282; B23K 26/32; B23K 11/002; B23K 11/00; B23K 9/23; B23K 2101/008; B23K 2103/04; B23K 10/02; B23K 15/0093; B23K 33/006; B23F 1/06; B23F 15/06; C21D 9/32; B23P 15/14; B21K 1/30; C23C 8/04
  See application file for complete search history.

(56) References Cited

U.S. PATENT DOCUMENTS

| | | | |
|---|---|---|---|
| 5,211,327 A | 5/1993 | Clarke et al. | |
| 6,165,597 A | 12/2000 | Williams et al. | |
| 8,475,321 B2 | 7/2013 | Gutsmiedl et al. | |
| 8,597,150 B1 | 12/2013 | Downs et al. | |
| 9,156,110 B2 | 10/2015 | Chen et al. | |
| 2007/0029090 A1 | 2/2007 | Andreychuk et al. | |
| 2007/0029290 A1* | 2/2007 | Kehrer | B23K 26/28 219/121.14 |
| 2008/0202938 A1* | 8/2008 | Rao | C25D 5/022 205/234 |
| 2009/0084223 A1 | 4/2009 | Harrup et al. | |
| 2009/0266198 A1 | 10/2009 | Nosakowski | |
| 2013/0011182 A1 | 1/2013 | Chen et al. | |
| 2015/0196980 A1 | 7/2015 | Munjal | |

FOREIGN PATENT DOCUMENTS

| | | |
|---|---|---|
| DE | 102007018701 A1 | 2/2008 |
| DE | 102006062200 A1 | 6/2008 |
| DE | 102011077562 A1 | 12/2012 |
| EP | 1719572 A2 | 11/2006 |
| JP | 2002322536 A | 11/2002 |
| WO | WO2010016896 A1 | 2/2010 |
| WO | WO2017223549 A1 | 12/2017 |

OTHER PUBLICATIONS

Case-Hardening Article From Wikipedia.
PCT International Search Report dated Aug. 2, 2018 for corresponding PCT application No. PCT/US2018/027584, filed Apr. 13, 2018.

* cited by examiner

METHOD FOR FORMING A WELDED ASSEMBLY AND RELATED WELDED ASSEMBLY

CROSS-REFERENCE TO RELATED APPLICATIONS

This application is a continuation-in-part of U.S. application Ser. No. 15/491,081 filed Apr. 19, 2017, the disclosure of which is incorporated by reference as if fully set forth in detail herein.

FIELD

The present disclosure relates to a method for forming a welded assembly and a related welded assembly.

BACKGROUND

This section provides background information related to the present disclosure which is not necessarily prior art.

In the manufacture of spiral bevel (e.g., hypoid) ring gears for modern automotive driveline components such as axle assemblies and power take-off units, the ring gear can undergo various processes during its manufacture, such as carburizing or phosphate conversion coating. Such processes can be highly desirable to certain areas of the ring gear (e.g., the teeth of the ring gear), but may not be entirely desirable in one or more other areas of the ring gear. For example, certain heat-treatment processes could provide increased hardness in an area where toughness is desired. As another example, certain heat treatments and phosphate conversion coatings can be undesirable in areas where the ring gear will be joined to another structure via welding.

SUMMARY

This section provides a general summary of the disclosure, and is not a comprehensive disclosure of its full scope or all of its features.

In one form, the present disclosure provides a method for forming welded assembly. The method includes: providing a gear workpiece; machining the gear workpiece to form a joining section that defines a weld interface; applying a material to the outside surface of the gear workpiece including the joining section; cutting a plurality of teeth in the material-covered gear workpiece, each of the plurality of teeth having first and second flanks and a root, wherein the material does not reside on any one of the first flanks, the second flanks and the roots; heat treating the gear workpiece to harden the teeth; and finishing the heat-treated gear workpiece in a finishing process to form a finished ring gear, the finishing process comprising at least one of a turning operation and a lapping operation; wherein the material is disposed over the weld interface on the finished ring gear.

Optionally, the method can further include coupling the ring gear to one of a shaft and a case member such that at least a portion of the one of a shaft and a case member extends through the finished ring gear; and forming one or more welds between the weld interface on the finished ring gear and the one of the shaft and the case member, the one or more welds being formed in the weld interface.

Optionally, the finishing process can further include applying a phosphate conversion coating to the gear workpiece, wherein the material on the joining section does not support formation of the phosphate conversion coating.

If desired, the method can include shot peening the gear workpiece after the gear workpiece has been heat-treated to harden the teeth.

Optionally, providing the gear workpiece can include: providing a gear blank; and forging the gear blank to form the gear workpiece.

If desired, the material that is applied to the entire outside surface of the gear workpiece can be electroplated onto the outside surface of the gear workpiece. Optionally, the material can be copper, nickel, chrome, molybdenum and combinations thereof, discrete layers of copper, nickel, chrome, molybdenum and combinations thereof or a stop-off compound.

The thickness of the applied material can be relatively thin, such as less than or equal to 0.02 mm in thickness or less than or equal to 0.001 mm in thickness.

If desired, the joining section can include an abutment flange having a flange surface that intersects a through-bore formed in the finished ring gear. Optionally, the joining section can include an annular groove formed along a rotational axis of the finished ring gear between the flange surface and an annular surface of the weld interface.

In another form, the present disclosure provides a welded assembly that includes a ring gear and a metal plating. The ring gear has a body, a plurality of teeth and a joining section. The body defines a through-bore that is disposed along a rotational axis of the ring gear. The teeth extend about a circumference of the body and are hardened. The joining section defines a weld interface with an annular surface that is concentric with the through-bore. The metal plating is fixedly coupled to the annular surface.

Optionally, the joining section can further define an abutment flange that intersects a through-bore. The abutment flange can have a flange surface that is perpendicular to the annular surface. The metal plating can be disposed over the flange surface of the abutment flange.

The metal plating can comprise at least one layer of copper, nickel chrome, molybdenum and combinations thereof. The metal plating can comprise at least one layer that is at least partly formed of nickel.

Optionally, the welded assembly can include a rotary member that is received in the through-bore. The rotary member can be welded to the joining section such that a bond is formed between the annular surface of the weld interface and the rotary member. If desired, the rotary member can be one of a shaft and a differential case.

Optionally, the joining section can further define an abutment flange that intersects a through-bore. The abutment flange can have a flange surface that is perpendicular to the annular surface and over which the copper plating is disposed. The rotary member can have a shoulder that is abutted against the flange surface.

In another form, the present disclosure provides a method for forming a welded assembly that includes: providing a workpiece; machining the workpiece to form a machined workpiece with a joining section that defines a weld interface; applying a material to the machined workpiece including the joining section; machining at least a portion of the material-coated workpiece to form a machined-and-material-coated workpiece, the machined-and-material-coated workpiece having at least one surface on which the material is not disposed, the at least one surface not being disposed on the weld interface; heat-treating the machined-and-material-coated workpiece to form a heat-treated workpiece; and welding the weld interface to a secondary workpiece.

Optionally, the material can comprise at least one layer of copper, nickel, chrome, molybdenum and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
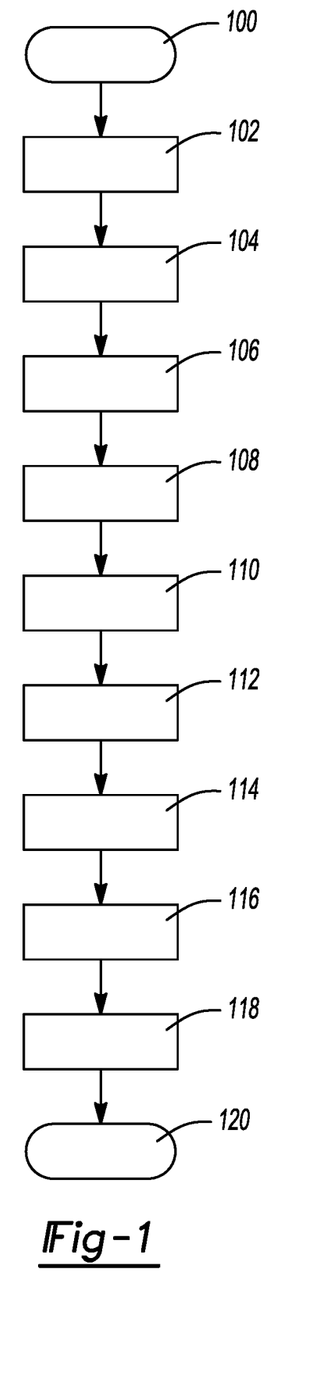
FIG. 1 is a schematic illustration in flow-chart form of an exemplary method performed in accordance with the teachings of the present disclosure.

A method for forming a welded assembly is schematically illustrated in FIG. 1. The welded assembly is configured for use in a vehicle driveline component, such as a front or rear axle assembly or a power take-off unit.

Figure 2:
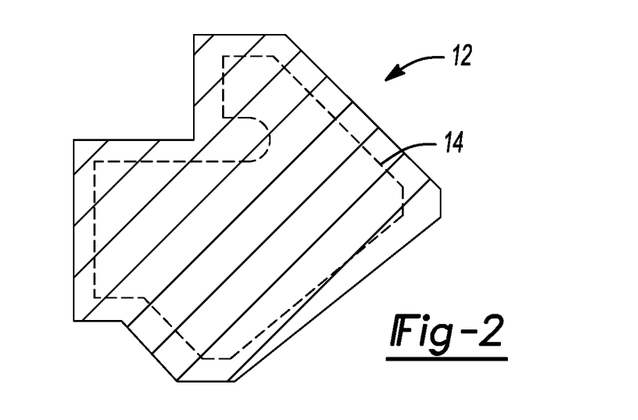
FIG. 2 is a cross-sectional view taken through an as-forged gear workpiece.

The method begins at bubble 100 and proceeds to block 102 where a gear workpiece 12 (FIG. 2) is provided. With additional reference to FIG. 2, the gear workpiece 12 is formed from a suitable steel material in one or more appropriate operations, such as a forging operation that includes a forging die (not shown). In the particular example provided, the gear workpiece 12 is formed via forging a gear blank that is cut from a suitably-shaped steel stock. If desired, the gear workpiece 12 can be "near net formed" such that it is sized only slightly larger than a finished ring gear that will be produced by the present method. In this regard, those of skill in the art will understand the term "near net" as meaning that the gear workpiece 12 is formed with a relatively small amount of excess stock on most or all of the surfaces of the gear workpiece 12 that will need to be machined off to produce a finished ring gear that is sized and shaped in the desired manner. In the particular example provided, the gear workpiece 12 is forged so that the teeth of the finished ring gear will need to be cut in a subsequent machining operation. In the cross-sectional view of FIG. 2, a broken line 14 is shown that depicts the outline of the finished ring gear as set within the gear workpiece 12. The portion of the gear workpiece 12 that is shown outside the broken line 14 represents the excess material that will need to be removed from the gear workpiece 12 in subsequent operations described below to form the finished ring gear.

Figure 3:
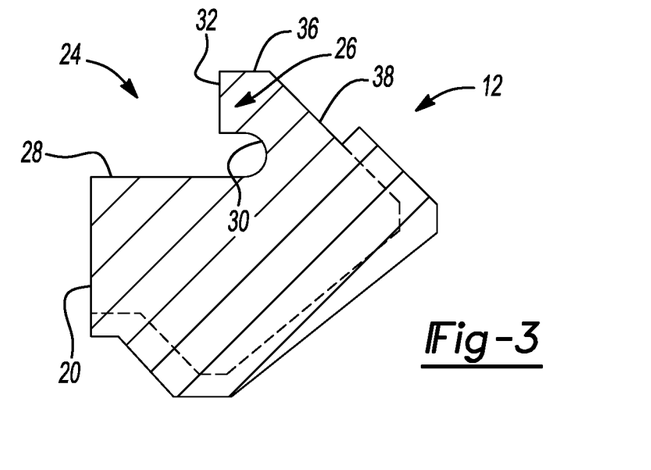
FIG. 3 is a cross-sectional view similar to that of FIG. 2 but illustrating the gear workpiece after an initial (green) machining operation.

Returning to FIG. 1 and with additional reference to FIG. 3, the method can proceed to block 104 where the gear workpiece 12 can be machined or formed (e.g., forged) in one or more operations to form an intermediate bore 20 as well a portion of the finished ring gear. The intermediate bore 20 is configured to be concentrically disposed about a rotational axis of the finished ring gear and is sized somewhat smaller in diameter than a through bore that is to be formed in the finished ring gear. Construction in this manner permits the intermediate bore 20 to be used in various processes to align or orient the gear workpiece 12 to a particular axis but leaves some excess stock on the gear workpiece 12 that is removed via machining (e.g., hard turning) subsequent to the heat treatment of the gear workpiece 12 so that the through bore in the finished ring gear can be accurately sized and oriented. The portion of the finished ring gear (i.e., the portion of the gear workpiece 12 that has been formed and/or machined to meet the dimensional requirements of the finished ring gear) comprises a joining section 24 that can define a weld interface 26, an abutment flange 28, and an undercut groove 30. The weld interface 26 can define an annular surface 32 that can be disposed concentric with the intermediate bore 20. The abutment flange 28 can be disposed perpendicular to the annular surface 32 of the weld interface 26 and can intersect the intermediate bore 20. The undercut groove 30 can be disposed along the axis of the intermediate bore between the annular surface 32 of the weld interface 26 and the abutment flange 28.

Optionally, other surfaces of the gear workpiece 12 can be formed and/or machined to conform to the dimensional requirements of the finished ring gear. In the example provided, an axial end face 36 of the finished ring gear, which is defined by the joining section 24, and a portion 38 of a radially outer surface of the finished ring gear that would be proximate the heel of the finished ring gear are finish machined (i.e., machined to the dimensional requirements of the finished ring gear so that no excess stock is present).

Figure 4:
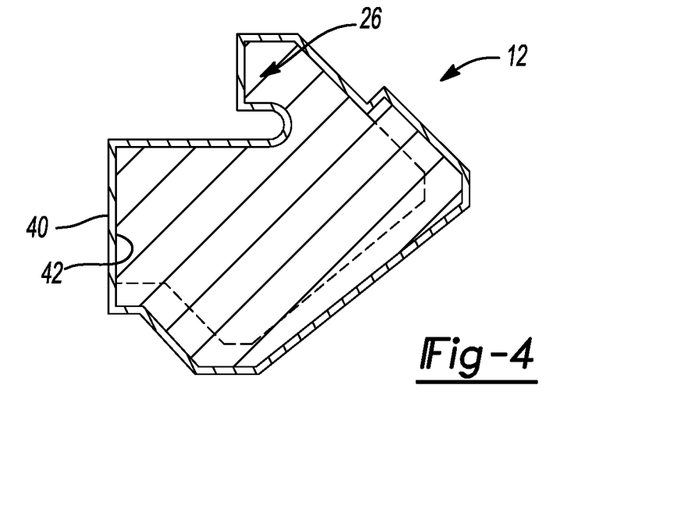
FIG. 4 is a cross-sectional view similar to that of FIG. 3 but illustrating the initially machined gear workpiece as coated with a material.

With reference to FIGS. 1 and 4, the method can proceed to block 106 where a material 40 is fixedly applied to the outside surface 42 of the formed and/or machined gear workpiece 12 including the joining section 24. The material 40 has a chemical composition and thickness that are configured to provide the gear workpiece 12 with desired properties. One such desired property could be the ability to inhibit the migration of carbon into the steel of the gear workpiece 12 through the material 40. Another such desired property could be the ability to inhibit the formation of a coating, such as a phosphate conversion coating, onto an outer surface of the material-coated gear workpiece 12. Ideally, the material 40 does not need to be completely removed from the finished ring gear and is compatible with the subsequent manufacture of the welded assembly. For example, it is desirable that the material 40 not form an adverse chemical reaction with the other component(s) of the welded assembly to which the finished ring gear will be joined, or with a lubricant that is employed in the vehicle driveline component with which the welded assembly will contact.

The material 40 could be a commercially available stop-off compound, but in the particular example provided, is a flash coating of a suitable metal plating that is deposited onto the surface of the formed and/or machined gear workpiece 12. Non limiting examples of suitable metals include copper, nickel, chrome, molybdenum and combinations thereof. The metal can be deposited in any suitable manner, such as electroplating or electroless deposition, and can be deposited in one or more discrete (and different) layers. The metal plating can have a thickness in relevant areas (e.g., the weld interface 26) that is less than or equal to 0.02 mm, and more preferably a thickness that is less than or equal to 0.001 mm. The thickness of the metal plating in non-relevant areas (e.g., portion of the gear workpiece 12 that is shown outside the broken line 14 in FIG. 14 that is representative of the excess material that will need to be removed from the gear workpiece 12 in subsequent operations described below to form the finished ring gear) need not be uniform in thickness and need not be formed to a predetermined minimum thickness.

Figures 5, 6, 7, 8:
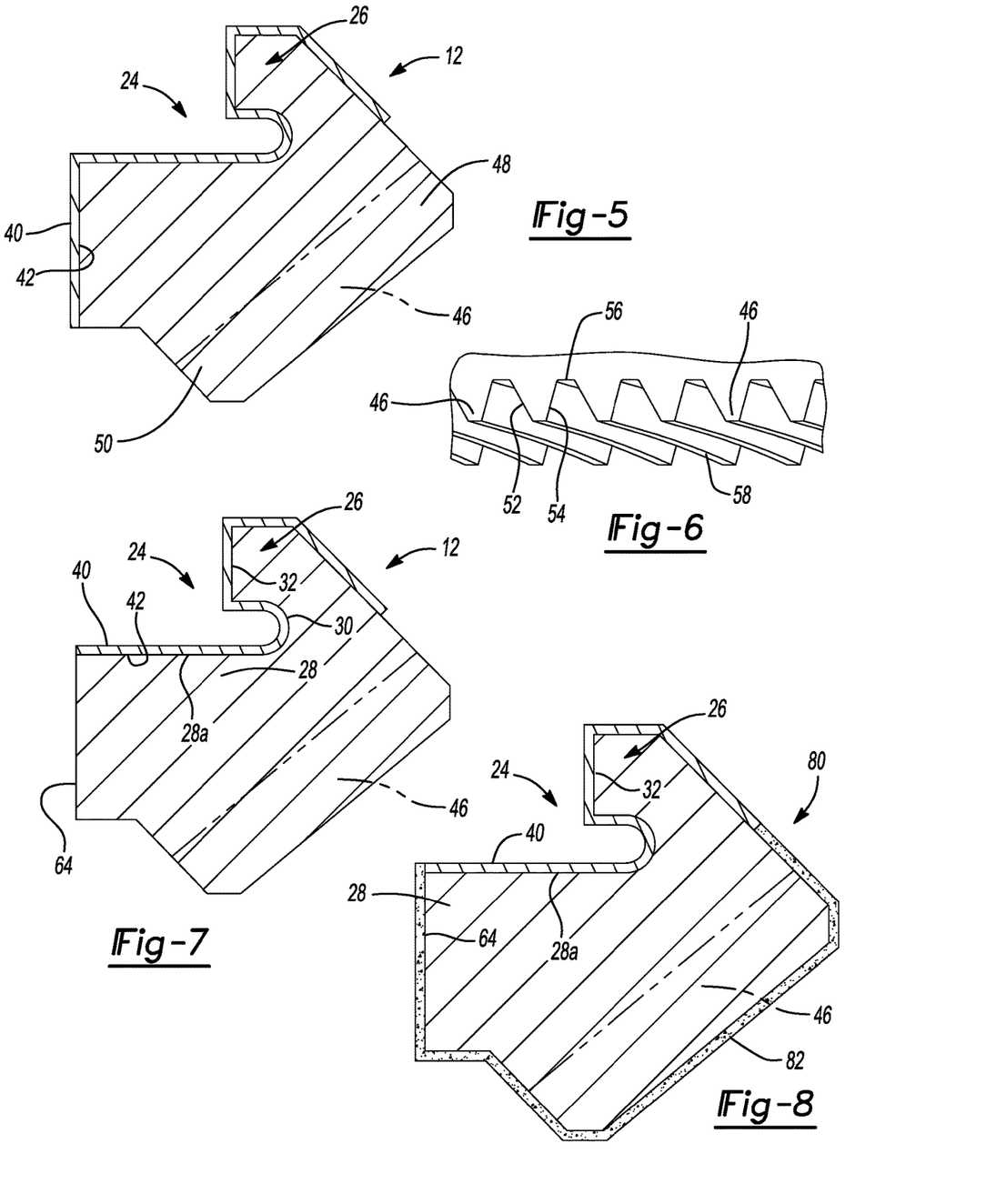
FIG. 5 is a cross-sectional view similar to that of FIG. 4 but illustrating the material-coated gear workpiece after an intermediate machining operation.
FIG. 6 is a side elevation view of a portion of the gear workpiece after the intermediate machining operation.
FIG. 7 is a cross-sectional view similar to that of FIG. 5 but illustrating the gear workpiece after heat treatment, shot-peening and finishing operations.
FIG. 8 is a cross-sectional view similar to that of FIG. 7 but illustrating the heat-treated, shot-peened and finished gear workpiece after a phosphate conversion coating operation that produces a finished ring gear.

With reference to FIGS. 1 and 5, the method can proceed to block 108 where an intermediate machining step can be performed to remove stock (i.e., the material 40 and the underlying steel stock) from portions of the material-coated gear workpiece 12. For example, the teeth 46 of the finished ring gear can be cut in an appropriate machining process, such as face hobbing, as can be the non-tooth surfaces of the finished ring gear proximate the heel 48 and toe 50. With brief reference to FIG. 6, each of the gear teeth 46 can have first and second flanks 52 and 54, respectively, a root 56 and a top land 58. In the example provided, the material 40 (FIG. 5) is entirely removed from all surfaces of the gear teeth 46 (i.e., the first and second flanks 52 and 54, the root 56 and the top land 58).

With renewed reference to FIGS. 1 and 5, the method can proceed to block 110 where the intermediate-machined gear workpiece 12 can be heat treated to harden the gear teeth 46. Heat treatment can include carburizing the gear workpiece 12 to introduce additional carbon into the steel. The material 40 that is disposed on the intermediate-machined gear workpiece 12, however, blocks or otherwise inhibits migration of carbon atoms through the material 40 into the underlying steel material. Consequently, the carbon content of the portion of the intermediate-machined gear workpiece 12 that is covered by the material 40 is not increased when the teeth 46 are carburized. This permits the material-covered portions of the intermediate-machined gear workpiece 12 to exit the heat treatment process with a surface hardness and carbon content that are relatively lower than that of the teeth 46.

The method can proceed to block 112 where the heat-treated gear workpiece 12 can be processed in a cold working operation, such as shot-peening.

With reference to FIGS. 1 and 7, the method can proceed to block 114 where the shot-peened gear workpiece 12 can be processed in a finishing operation. In the particular example provided, the finishing operation includes a hard-turning operation and a lapping operation. The hard-turning operation forms/sizes a through bore 64 in the gear workpiece 12. It will be appreciated that during the hard-turning operation, the material 40—that was present on the interior surface of the intermediate bore 20 (FIG. 3) is removed along with the excess steel stock to thereby form the (properly sized and located) through bore 64 to a desired size and to ensure that the through bore 64, teeth 46 and annular surface 32 of the weld interface 26 are disposed concentrically about the rotational axis of the gear workpiece 12. Since the (flange) surface 28a of the abutment flange 28 intersects the surface of the intermediate bore 20 (FIG. 3) in the machined gear workpiece 12 (FIG. 3), and since the through bore 64 is sized larger in diameter than the intermediate bore 20 (FIG. 3), it will be appreciated that the flange surface 28a of the abutment flange 28 also intersects the through bore 64. In the lapping operation, the teeth 46 of the hard-turned gear workpiece 12 are lapped to a desired finish.

With reference to FIGS. 1 and 8, the method can proceed to block 116 where the hard-turned and lapped gear workpiece 12 (FIG. 7) can undergo a coating operation in which a desired coating is applied to the hard-turned and lapped gear workpiece 12 (FIG. 7) to thereby form the finished ring gear 80. In the example provided, a phosphate conversion coating 82 is applied to the hard-turned, lapped gear workpiece 12 (FIG. 7). The material 40 on the gear workpiece 12 (FIG. 7), however, does not support the formation of the phosphate conversion coating 82 and as such, the phosphate conversion coating 82 is applied only to those surfaces that were machined after the point at which the material 40 was applied to the machined gear workpiece 12 (FIG. 3). In this regard, the material 40 that is disposed on the joining section 24 inhibits the formation of the phosphate conversion coating 82 that is disposed on other parts of the finished ring gear 80 and as such, no phosphate conversion coating 82 is disposed on the joining section 24.

Figure 9:
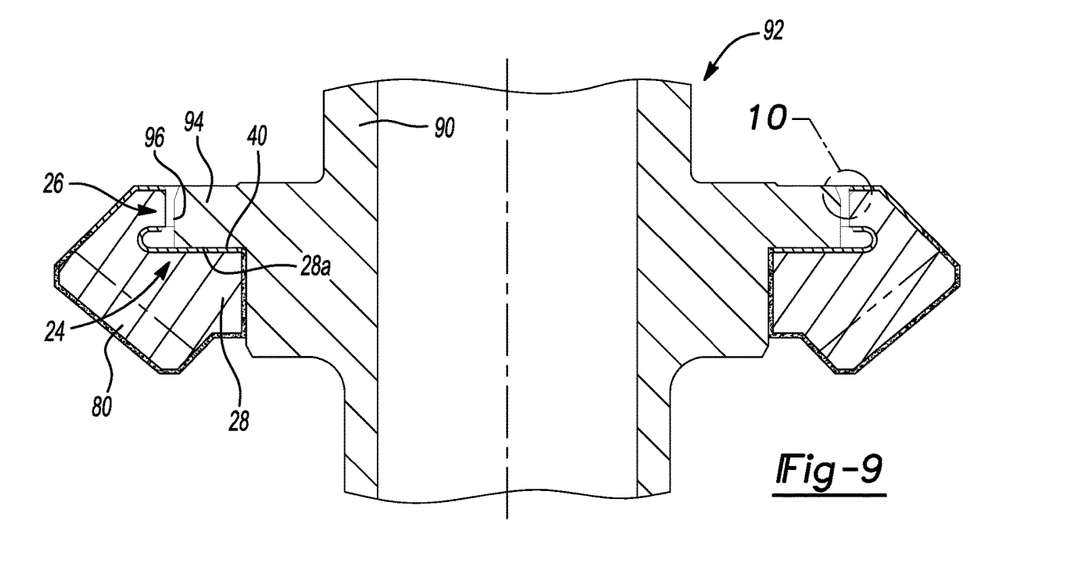
FIG. 9 is a cross-sectional view of the finished ring gear as fixedly coupled via welding to a rotary member to form a welded assembly.
Figure 10:
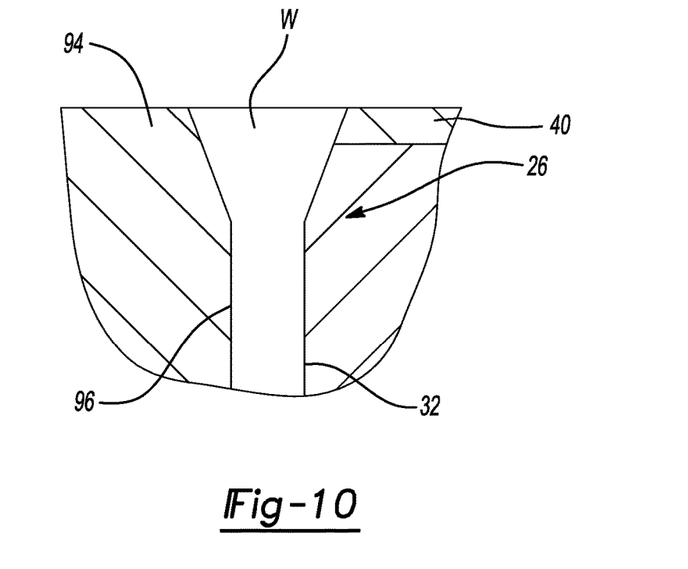
FIG. 10 is an enlarged portion of the welded assembly of FIG. 9.

With reference to FIGS. 1, 9 and 10, the method can proceed to block 118 where the finished ring gear 80 can be fixedly coupled to a rotary member 90 via a welding operation to form a welded assembly 92. The rotary member 90 can be a shaft or a differential case and can be assembled to the finished ring gear 80 such that at least a portion of the rotary member 90 extends through the finished ring gear 80. In the example provided, the rotary member has a shoulder 94 that is abutted against the material 40 that coats or covers the flange surface 28a of the abutment flange 28 on the finished ring gear 80. A radially outer surface 96 of the shoulder 94 can be received within the annular surface 32 of the weld interface 26.

Figure 11:
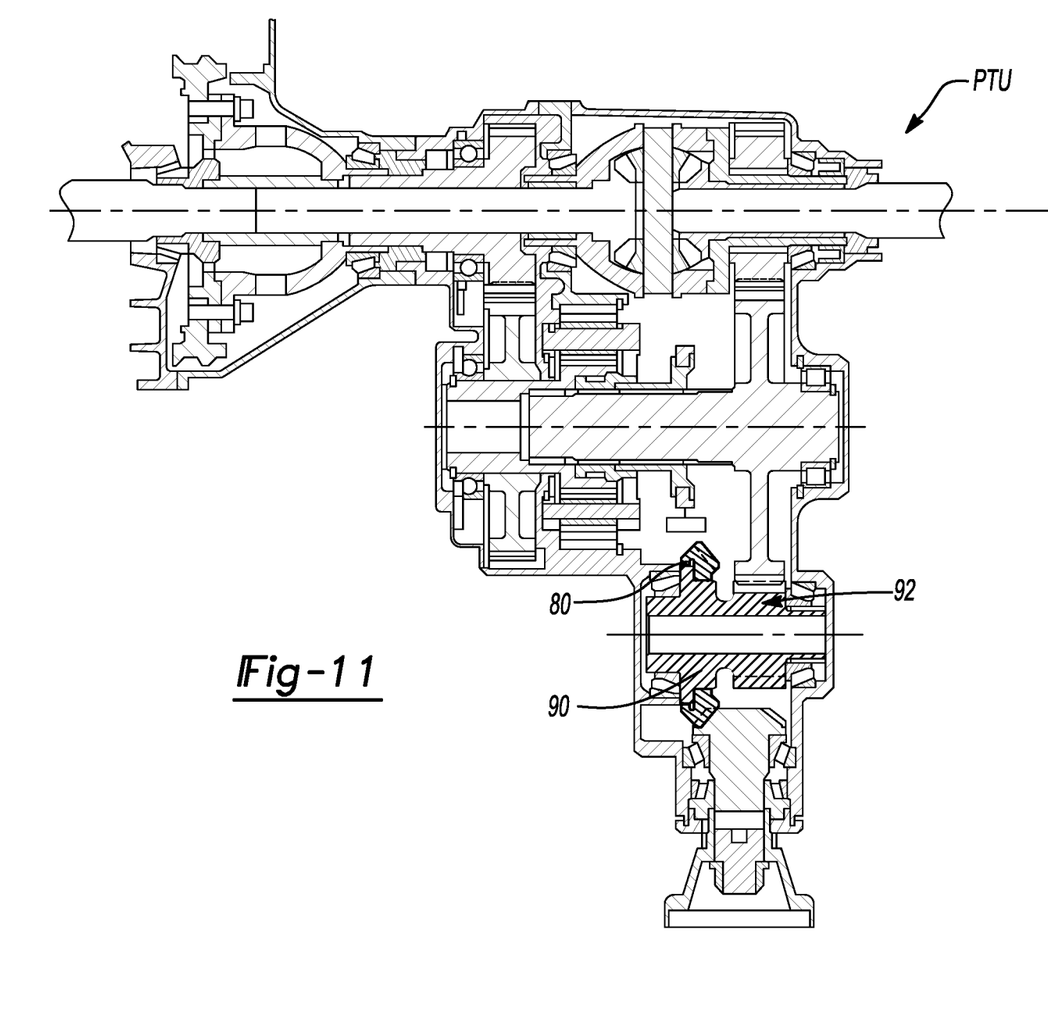
FIG. 11 is a cross-sectional view of an exemplary power take-off unit having a welded assembly constructed in accordance with the teachings of the present disclosure.
Figure 12:
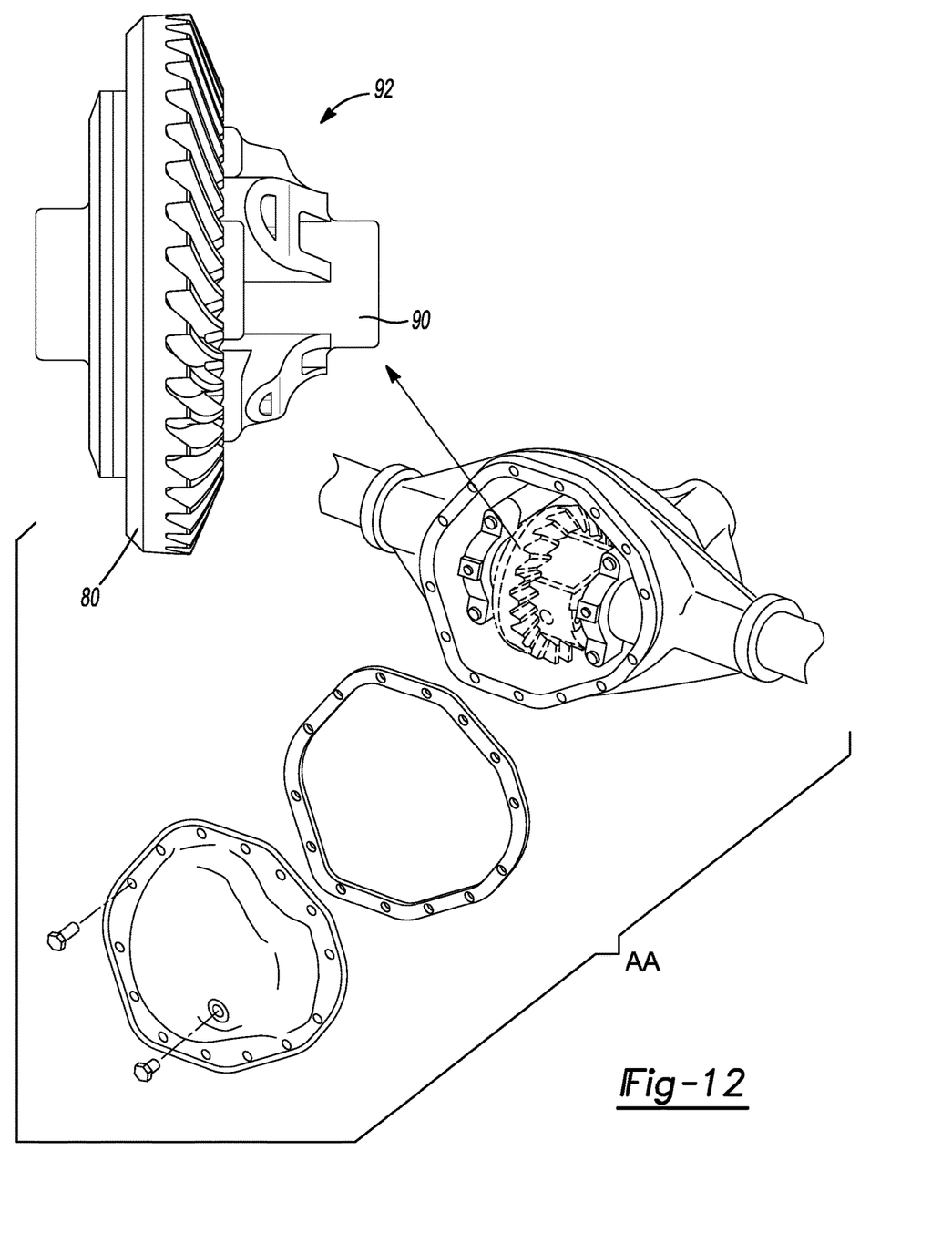
FIG. 12 is a cross-sectional view of an exemplary axle assembly having a welded assembly constructed in accordance with the teachings of the present disclosure.

One or more welds W can be formed between the weld interface 26 on the finished ring gear 80 and the shoulder 94 of the rotary member 90 such that at least a portion of the annular surface 32 is bonded to at least a portion of the radially outer surface 96. The weld(s) W can be formed in any suitable welding process, including arc welding, TIG welding, MIG welding, and various types of solid state welding, including resistance welding, friction welding and Magnetically Impelled Arc Butt (MIAB) welding. In the particular example provided, the weld(s) W are formed via laser welding. The material 40 that covers the several surfaces of the joining section 24, including the annular surface 32, is not removed prior to the formation of the one or more welds W and moreover, does not adversely affect the quality or strength of the one or more welds in any significant manner despite the fact that the material 40 is incorporated into the molten material formed during the welding operation that eventually solidifies to form the one or more welds W that secures the finished ring gear 80 to the rotary member 90. For example the material 40 does not affect the strength of the one or more welds W by an amount that is greater than or equal two percent (2%) of the ultimate shear strength of the one or more welds W had the material 40 not been present. The welded assembly 92 can be subsequently integrated into a driveline component, such as the power take-off unit PTU of FIG. 11 or the axle assembly AA of FIG. 12. The method can proceed to bubble 120 where control can end.

Figure 10A:
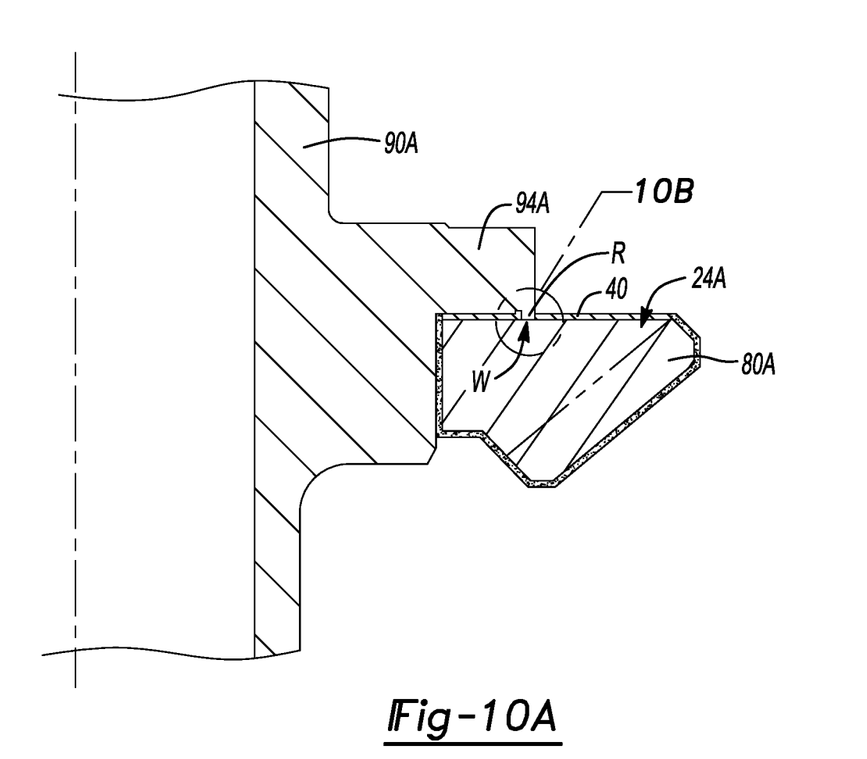
FIG. 10A is a cross-sectional view of another finished ring gear as fixedly coupled via an alternative welding operation to another rotary member to form another welded assembly.
Figure 10B:
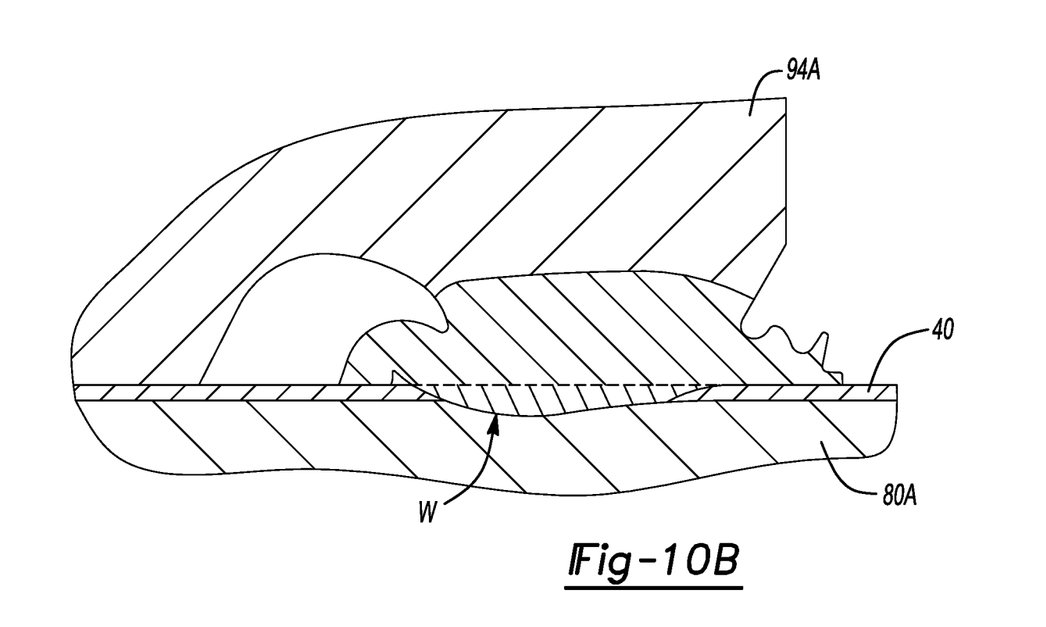
FIG. 10B is an enlarged portion of FIG. 10A.

As mentioned above, other weld process could be employed to form the assembly. Consequently, it will be appreciated that various changes to the geometry of one or more of the components may need to accommodate a desired weld operation. With reference to FIGS. 10A and 10B, for example, the joining section 24A on the finished ring gear 80A is an annular surface that can be generally perpendicular to a rotational axis of the finished ring gear 80A, while the rotary member 90A includes a circumferential rib R that extends from the shoulder 94A. This configuration is suitable for arrangements in which resistance welding is employed to weld the rotary member 90A to the finished ring gear 80A.

Figure 13:
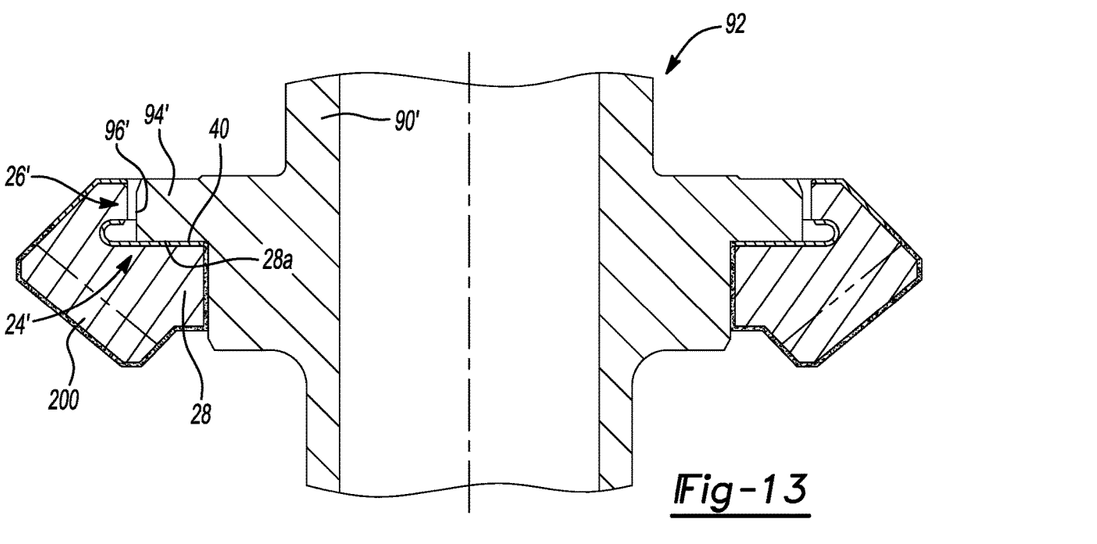
FIG. 13 is a cross-sectional view of another exemplary welded assembly constructed in accordance with the teachings of the present disclosure.

While the welded assembly has been illustrated and described above as comprising a forging that is coated with a suitable material, such as electroplated copper, that is subsequently machined, hardened, finished and then welded to a rotary member, it will be appreciated that the invention could be constructed somewhat differently. With reference to FIG. 13, a conventionally manufactured (i.e., forged, machined, hardened, shot peened, hard-turned and lapped) ring gear 200 (or alternatively, the finished ring gear 80 of FIG. 9) could be welded to a rotary member 90' that is constructed in accordance with the teachings of the present disclosure. The rotary member 90' can be formed in a process that includes: a) forming a blank; b) upset forging the blank (to form a structure that roughly conforms to the shoulder 94' of the rotary member 90') to form a forged workpiece; c) machining the forged workpiece to form a machined workpiece having a joining section 24' that defines a weld interface 26' (i.e., the flange 94', including the radially outer surface 96'); d) forming a material-coated workpiece by applying a material (e.g., electroplated copper or a stop-off compound as discussed above) to the outside surface of the machined workpiece including the joining section 24'; e) machining portions of the material-coated workpiece except for the weld interface 26' to formed a coated, machined workpiece having an exterior surface having portions that are coated with the material; f) heat-treating the coated, machined workpiece to form a heat-treated workpiece; g) optionally hard machining (e.g., hard turning) the heat treated workpiece; and afterwards h) welding the conventionally manufactured ring gear 200 to the weld interface 26' without first removing the material that coats the weld interface 26'.

Figure 14:
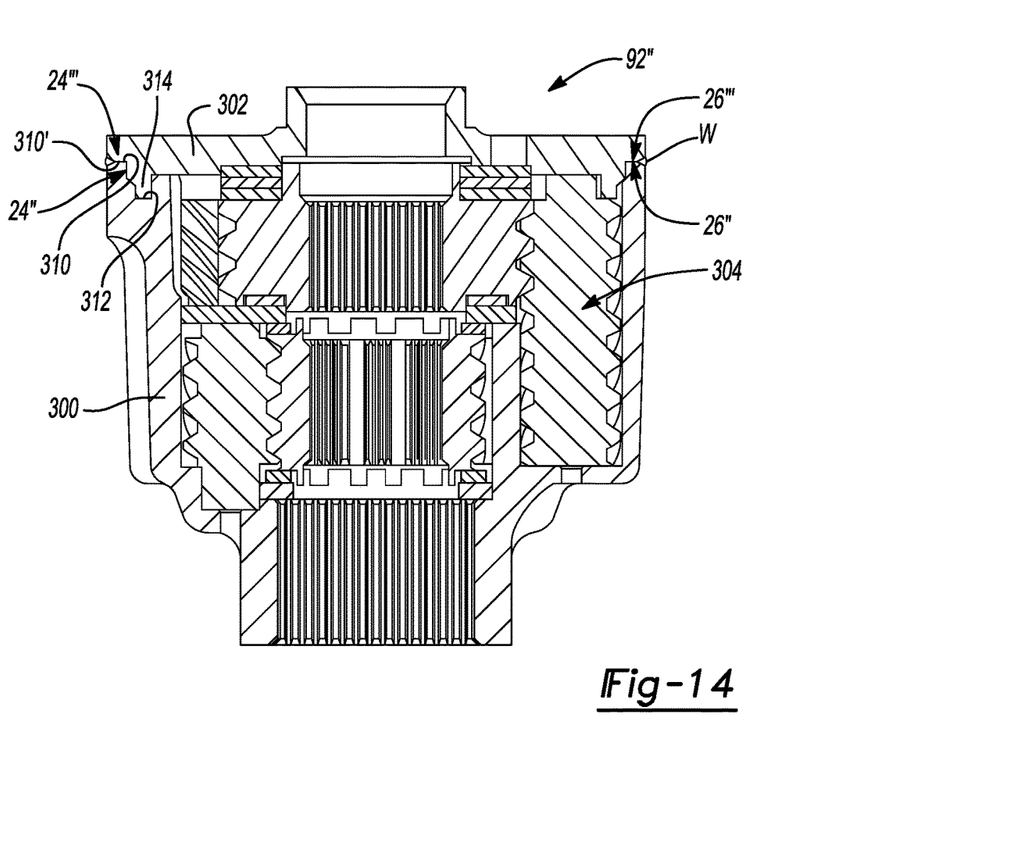
FIG. 14 is a cross-sectional view of yet another exemplary welded assembly constructed in accordance with the teachings of the present disclosure.

In FIG. 14, another welded assembly constructed in accordance with the teachings of the present disclosure is illustrated. The welded assembly 92" is a differential assembly having a differential case 300, a case cover 302 and a differential gearset 304. The differential gearset 304 can be constructed in a conventional manner and need not be discussed in detail herein.

The differential case 300 and/or the case cover 302 can be constructed in a manner similar to that of the finished ring gear 80 (FIG. 9) or the rotary member 90' (FIG. 13). For example, the differential case 300 can be formed in a process that includes: a) forming a workpiece in a suitable process, such as casting or forging; b) machining the workpiece to form a machined workpiece having a joining section 24" that defines a weld interface 26" (i.e., an axial end face 310 of the differential case 300) along with a locating groove 312 that can be employed to align the case cover 302 to the rotational axis of the differential case 300; c) forming a material-coated workpiece by applying a material (e.g., electroplated copper or a stop-off compound as discussed above) to the internal and external surfaces of the machined workpiece including the joining section 24"; d) machining portions of the material-coated workpiece except for the weld interface 26" to form a coated, machined workpiece having an exterior surface with portions that are coated with the material; e) heat-treating the coated, machined workpiece to form a heat-treated workpiece; g) optionally hard machining (e.g., hard turning, boring) the heat treated workpiece to form the differential case 300.

Similarly, the case cover 302 can be formed in a process that includes: a) forming a workpiece in a suitable process, such as casting or forging; b) machining the workpiece to form a machined workpiece having a joining section that defines a weld interface 26''' (i.e., an axial end face 310' of the case cover 302) along with a locating rib 314 that is configured to be received into the locating groove 312 in the differential case 300; forming a material-coated workpiece by applying a material (e.g., electroplated copper or a stop-off compound as discussed above) to the internal and external surfaces of the machined workpiece including the joining section 24'''; machining portions of the material-coated workpiece except for the weld interface 26''' to form a coated, machined workpiece having an exterior surface with portions that are coated with the material; heat-treating the coated, machined workpiece to form a heat-treated workpiece; optionally hard machining (e.g., hard turning, boring) the heat-treated workpiece to form the case cover 302.

Afterwards, the differential gearset 304 can be assembled into the differential case 300, the case cover 302 can be abutted to the axial end face 310 of the differential case 300, and the case cover 302 can be welded to the weld interface on the differential case 300 without removing the material that coats the weld interface 26".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming welded assembly comprising:
providing a gear workpiece;
forming a joining section on the gear workpiece that defines a weld interface;
fixedly applying a material to the outside surface of the gear workpiece including the joining section, the material comprising nickel;
cutting a plurality of teeth in the material-covered gear workpiece, each of the plurality of teeth having first and second flanks and a root, wherein the material does not reside on any one of the first flanks, the second flanks and the roots;
heat treating the gear workpiece to harden the teeth; and
finishing the heat-treated gear workpiece in a finishing process to form a finished ring gear, the finishing process comprising a lapping operation;
wherein the material is disposed over the weld interface on the finished ring gear.

2. The method of claim 1, further comprising:
coupling the finished ring gear to one of a shaft and a case member such that at least a portion of the one of the shaft and the case member extends through the finished ring gear; and
forming one or more welds between the weld interface on the finished ring gear and the one of the shaft and the case member, the one or more welds being formed in the weld interface.

3. The method of claim 1, wherein the finishing process further comprises applying a phosphate conversion coating to the gear workpiece, wherein the material on the joining section does not support formation of the phosphate conversion coating.

4. The method of claim 1, wherein after heat treating the gear workpiece to harden the teeth, the method comprises shot peening the gear workpiece.

5. The method of claim 1, wherein providing the gear workpiece comprises:
providing a gear blank; and
forging the gear blank to form the gear workpiece.

6. The method of claim 1, wherein applying the material to the outside surface of the gear workpiece comprises plating the material onto the entire outside surface of the gear workpiece.

7. The method of claim 6, wherein the material comprises copper.

8. The method of claim 6, wherein the material is plated onto the outside surface of the gear workpiece via electroplating or electroless plating.

9. The method of claim 1, wherein the material on the weld interface has a thickness that is less than or equal to 0.02 mm.

10. The method of claim 9, wherein the thickness of the material on the weld interface is less than or equal to 0.001 mm.

11. The method of claim 1, wherein the material is a stop-off compound.

12. A gear constructed in accordance with the method of claim 1.

13. The method of claim 1, wherein the joining section comprises an abutment flange having a flange surface that intersects a through-bore formed in the finished ring gear.

14. The method of claim 13, wherein the joining section comprises an annular groove formed along a rotational axis of the finished ring gear between the flange surface and an annular surface of the weld interface.

15. A method for forming a welded assembly comprising:
providing a workpiece;
creating a joining section on the workpiece that defines a weld interface;
applying a material to the workpiece including the joining section, the material comprising nickel;
machining at least a portion of the material-coated workpiece to form a machined-and-material-coated workpiece, the machined-and-material-coated workpiece having at least one surface on which the material is not disposed, the at least one surface not being disposed on the weld interface;
heat-treating the machined-and-material-coated workpiece to form a heat-treated workpiece; and
welding the weld interface to a secondary workpiece.

16. An assembly constructed in accordance with the method of claim 15.

* * * * *